(12) United States Patent
Mohrmann et al.

(10) Patent No.: US 7,835,612 B2
(45) Date of Patent: Nov. 16, 2010

(54) SPLICED FIBER TRAY SOFT DUROMETER MATERIAL (SDM) MANIFOLD

(75) Inventors: George H. Mohrmann, Plano, TX (US); Daniel L. Peterson, Sachse, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 12/336,645

(22) Filed: Dec. 17, 2008

(65) Prior Publication Data

US 2010/0150514 A1    Jun. 17, 2010

(51) Int. Cl.
*G02B 6/00* (2006.01)
*G02B 6/255* (2006.01)

(52) U.S. Cl. .......................................... 385/135; 385/99

(58) Field of Classification Search ............. 385/95–99, 385/134–137
See application file for complete search history.

(56) References Cited

U.S. PATENT DOCUMENTS

| | | | | |
|---|---|---|---|---|
| 5,444,804 A | * | 8/1995 | Yui et al. ........................ | 385/49 |
| 5,515,472 A | * | 5/1996 | Mullaney et al. ............. | 385/135 |
| 5,907,653 A | * | 5/1999 | Burek et al. .................. | 385/135 |
| 5,933,564 A | * | 8/1999 | Pavlath ......................... | 385/139 |
| 6,744,963 B2 | * | 6/2004 | Hwang ......................... | 385/139 |
| 6,763,170 B2 | * | 7/2004 | Kordahi et al. ............... | 385/135 |

* cited by examiner

*Primary Examiner*—Daniel Petkovsek

(57) ABSTRACT

A manifold for holding spliced optical fibers and their protective plastic coatings in a secure and motionless manner. The manifold includes a "clamp" made from a soft durometer material (SDM) such as a high strength silicone mold-making rubber or a dry polymer gel that has been partially sliced to a depth of about 75%. The manifold permits ease of insertion of a spliced optical fiber into, and removal of that spliced optical fiber from, an SDM-slice without disturbing other fibers that are held in other slices in the manifold. In a particular embodiment the gel or rubber SDM fills a four-sided plastic box to overflow. Slices in the SDM are parallel to each other and to front and back walls of the box which has a hinged cover to exert pressure on the overflow SDM material when the cover is closed to increase holding force on splice-junctions of embedded bare-glass optical fibers, those fibers within their respective protective coatings exiting the box, left and right, via cut-outs in the side walls of the box.

12 Claims, 4 Drawing Sheets

SPLICED FIBER TRAY SOFT DUROMETER MATERIAL (SDM) MANIFOLD

BACKGROUND INFORMATION

A typical fiber optic cable includes a central core including a plurality of buffer tubes each containing approximately twelve to twenty-two protectively-coated individual optical fibers. A glass fiber without its protective covering is only 125 microns in diameter, where a micron is one-millionth of a meter (hereinafter "μm") or only 0.000039 inches.

When a splice is made between two glass fibers in the field, an individual fiber is first taken out of its buffer tube and a portion of the plastic coating is necessarily removed from the vicinity of the splice-junction. The glass fiber is scored with a special cleaver and put in a fusion machine along with the glass end from the other fiber to which it is being spliced. The fusion machine burns or melts the two glass ends together forming the splice which needs to be covered and protected.

Typically, spliced fibers in the field are maintained in fiber-separator apparatus termed a "manifold" which rests in a container termed a "splice tray." Currently, there are two approaches to storing spliced fibers in the manifold of a splice tray. One technique is to put a heat shrink over the splice-junction of an individual glass optical fiber, shrink it down using a heat source and, thereafter, place it in a manifold spaced apart from other optical fibers being held separately in that manifold. This approach has drawbacks including an increased attenuation at the splice-junction, long down-time required for the splice operation, and attendant high cost.

The other technique is to place all fibers that are spliced into a bare-glass fiber manifold chip, where each fiber is separated from the other. Then, one spreads room-temperature vulcanized silicone (RTV) over the tops of the fibers and manifold, and covers the vulcanized combination with a clear plastic sheet to contain the RTV while it cures. With this technique, a big problem can be encountered when attempting to remove one of the fibers to get to its splice-junction. That fiber is typically removed from the RTV and cleaned with a razor-knife. This is a risky operation because neighboring fibers in the same manifold may be carrying live communication traffic, where a slip of the razor knife can easily cause an outage in one or more neighboring fibers.

Therefore, there is need for a different kind of mechanism which can address the issues noted above and permit a technician to easily insert a single fiber into, and/or remove a single fiber from, a manifold holding a plurality of other optical fibers which can be carrying communication traffic.

DESCRIPTION OF THE PREFERRED EMBODIMENT

Figure 1:
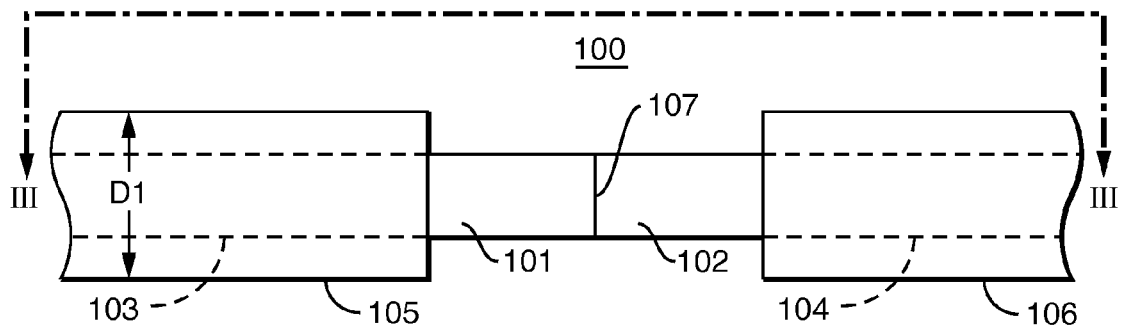
FIG. 1 is a side view diagram of an exemplary spliced optical fiber showing splice-junction, bare glass and plastic coating.

In this description, the same reference numeral in different Figs. refers to the same entity. Otherwise, reference numerals of each Fig. start with the same number as the number of that Fig. For example, FIG. 3 has numerals in the "300" category and FIG. 4 has numerals in the "400" category, etc.

In an overview, the exemplary preferred embodiments include a manifold which may be formed, for example, from silicone rubber such as high strength silicone mold-making rubber or from dry polymer gel, either having a Shore A durometer greater than 5 and less then 20. This patent application shall refer to any material meeting this standard as a soft durometer material (hereinafter "SDM") which shall include silicone rubber and dry polymer gel material having this durometer. "Shore A durometer" indicates the hardness (or softness) of the material and is named as such for instrument maker, Albert F. Shore, who developed a hardness measurement device called a durometer.

The American Society for Testing and Materials (ASTM) provides at least two common durometer scales, the "A" scale for softer materials and the "D" scale for harder ones. Each scale allows values between zero (soft materials) and 100 (hard materials). For example, a rubber band can have a durometer of 25 on the A scale and a solid truck tire can have a durometer of 50 on the D scale. The durometer of materials used for manifolds herein are measured on the "A" scale.

The manifold holds an optical fiber immobile inside the SDM. The optical fiber was formed from two separate optical fibers which had previously been spliced together into a contiguous optical fiber at a splice-junction or splice-interface. The SDM manifold holds the splice-junction securely and immobile relative to the SDM itself, but the fiber can be readily removed by a technician from the manifold without disturbing other optical fibers in the manifold.

The SDM is pliable and resilient and fills a rigid housing to overflow. When a cover attached to the housing is closed upon the pliable and resilient overflow it is forced to be constrained within the closed housing. This compression of the SDM places additional protective force upon the glass fiber in the region of the optical splice, thereby ensuring that the inserted splice-interface remains immobile relative to the SDM.

Ambient temperature variations can cause expansion and contraction of non-glass materials (e.g., insulation, etc.) comprising the fiber optic cable of which a glass optical fiber is but one of its component fibers, while the glass of this optical fiber and the other optical fibers in that cable do not expand or contract appreciably. This can create stresses on the glass in the various optical fibers in the fiber optic cable including the glass associated with the splice-junction. Therefore, it is important that a splice-junction, which is weaker than unperturbed glass fiber, be held motionless to minimize stresses on the junction and to mitigate the possibility of splice-junction fracture during such expansion and contraction.

For example, if the manifold is placed in a splice tray, exposed optical fibers which have exited the enclosure of the manifold may move responsive to expansion or contraction of their fiber optic cable as a function of temperature variation. The manifold may be forced to move relative to the splice tray as a result. But, the SDM-immersed optical fiber junction, held-in-place by an effective "SDM-clamp", itself remains immobile relative to its position within the SDM, thus minimizing the forces on the splice-junction.

This immobility is partially due to the propensity of the SDM to fill in all crevices around the splice-junction. The fused optical fibers are bare glass up to a pre-determined distance measured axially from the splice-junction and each is covered with a protective plastic coating thereafter, the fiber optic cable thus having a variation in diameter from bare glass to protected glass. Both the bare glass and the plastic coating are held by the SDM, whether the protective plastic coating is thin or thick. Although secure and immobile while being held by this SDM-clamp in a manifold constructed from this SDM, a service technician can easily access the splice-junction for servicing purposes, discussed below.

In a particular embodiment, a coverable box of general rectangular shape containing an overflowing amount of this SDM is provided. The box may be constructed from hard plastic or other suitable material. The front and back sides, or walls, of the box are solid, while the left and right sides have regularly spaced cutouts from the top of the side walls to near the bottom of the box, thereby exposing the SDM contained inside the box through the cutouts.

There are slits in the SDM, essentially parallel with the front and/or back walls of the box. Each slit is aligned with a different pair of cutouts on either side of the box to enable an optical fiber at its splice-junction to be placed within a slit while its protectively coated portions are exited left and right through its respective two cutouts. The SDM may fill the box to overflow at the top of the box, whereby heightened clamping by the SDM of all enveloped optical fibers is achieved by the compression force upon the SDM resulting from closing and locking the cover to the box.

FIG. 1 is an exemplary side view diagram of a spliced optical fiber 100 showing splice-junction, bare glass and plastic coating. Optical fiber 101 is bonded to optical fiber 102 at splice-junction 107 by way of a splicing operation. This can be accomplished by way of a fusion splicing operation or by some other splicing technique. If accomplished by some other technique, the resulting splice-junction 107 need not be orthogonal to direction of propagation of light waves within the fiber as shown, but may be offset by an angle, e.g., eight degrees. Dashed lines 103 and 104 represent the continuation of optical fibers 101 and 102 respectively beneath protective plastic coatings 105 and 106 respectively. The outside diameter of protective plastic coatings 105 and 106 is designated $D_1$.

Figure 2:
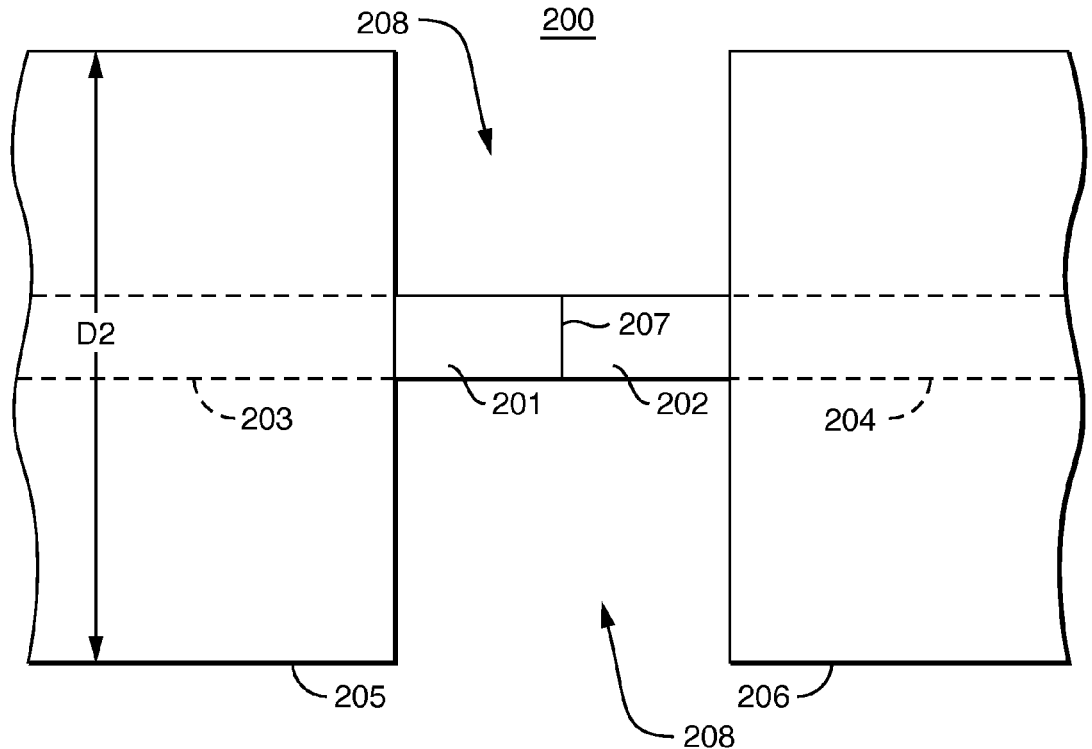
FIG. 2 is a side view diagram of another exemplary spliced optical fiber showing splice-junction, bare glass and thicker plastic coating.

FIG. 2 is an exemplary side view diagram of another spliced optical fiber showing splice-junction, bare glass and thicker plastic coating. Optical fiber 201 is bonded to optical fiber 202 at splice-junction 207 by way of a splicing operation and the splicing discussion of FIG. 1 above applies to FIG. 2 as well. Dashed lines 203 and 204 represent the continuation of optical fibers 201 and 202 respectively beneath protective plastic coatings 205 and 206 respectively. The outside diameter of protective plastic coatings 205 and 206 is designated $D_2$.

Bare glass fibers 101/102 and 201/202 may have a 125 µm diameter while the outside diameter $D_1$ of thin plastic coating 105/106 wrapped around the glass fiber may be 250 µm and the outside diameter $D_2$ of thick protective plastic coating 205/206 (i.e., a "pigtail" coating) can be 900 µm. The SDM specified herein shall fill the entire cylindrical crevice (e.g., space 208 in FIG. 2 and a comparable space in FIG. 1) formed by the optical fiber diameter variation, from 125 to 250 µm as shown in FIG. 1 or from 125 to 900 µm as shown in FIG. 2, thereby helping to hold the splice motionless. This SDM shall perform in this manner with respect to other variations in outside diameter as well. This operation is further detailed in FIG. 3.

Figure 3:
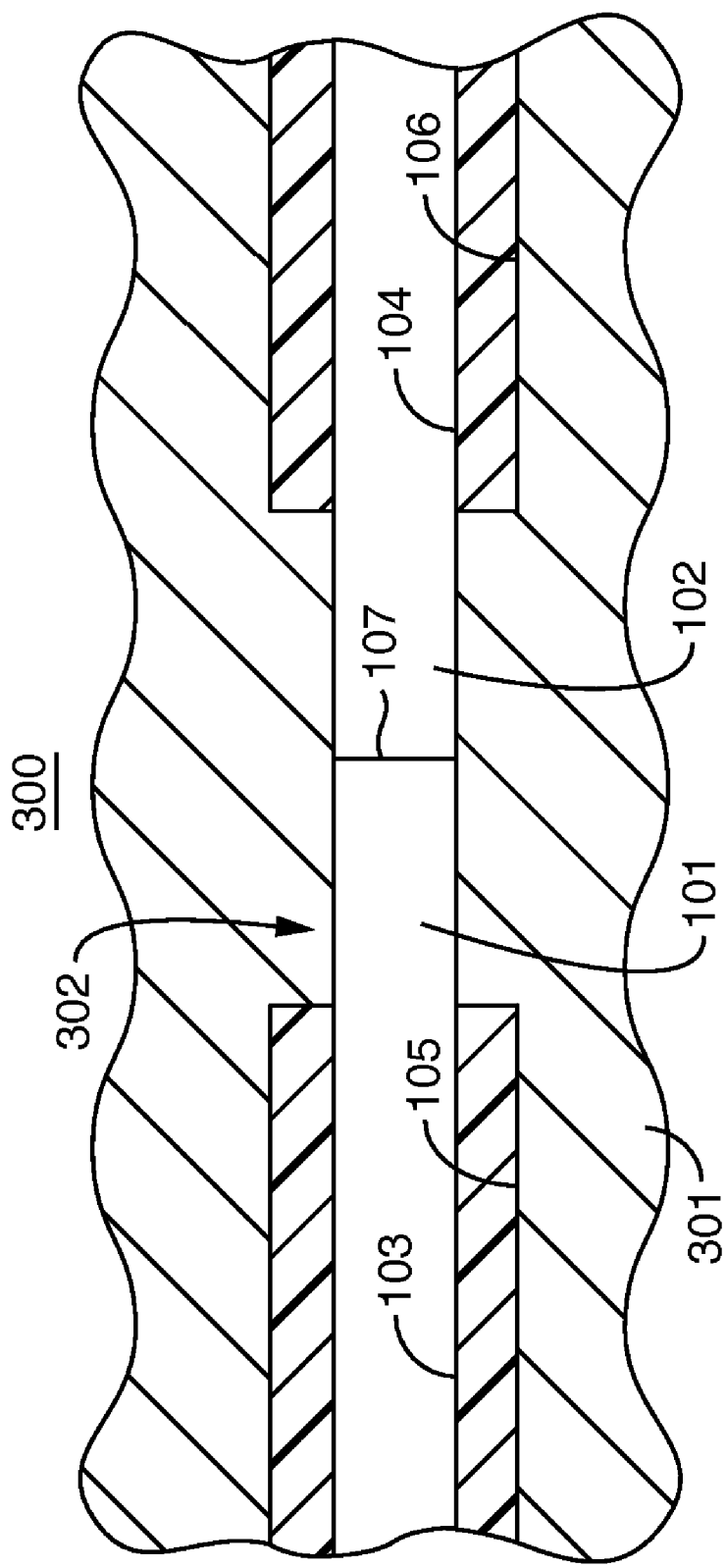
FIG. 3 is a cross-sectional diagram of an exemplary embodiment showing the spliced optical fiber of FIG. 1 immersed in soft durometer material (hereinafter: "SDM")

FIG. 3 is cross-sectional diagram of an exemplary embodiment 300, the diagram being derived from vertical plane slice III taken through the longitudinal axes of glass fibers 101 and 102 as shown in FIG. 1. Therefore, peripheries 103 and 104 of glass fibers 101 and 102 are shown as solid lines in this FIG. 3, in contrast with hidden lines in FIG. 1. Glass fibers 101 and 102 are shown spliced-together at splice-junction 107.

SDM 301, in a preferred embodiment, may be a high strength silicone mold-making rubber or a non-sticky, dry-polymer gel (or an equivalent material thereto), either material having, e.g., a Shore A durometer greater than 5 and less then 20. The rubber can be obtained from various suppliers such as, e.g., Dow Corning under the brand name Silastic. The gel can be obtained from various suppliers which, e.g., can be made to order by Soft Polymer Systems located in Gardena, Calif. As can be seen from FIG. 3, SDM 301 envelops glass fibers 101 and 102 as well as plastic protective coverings 105 and 106. Crevice 302 is a cylindrical space surrounding glass fibers 101 and 102 and that space is completely filled with SDM 301. This filling of this crevice helps to hold splice-joint 107 immobile relative to SDM-material 301.

Figure 4:
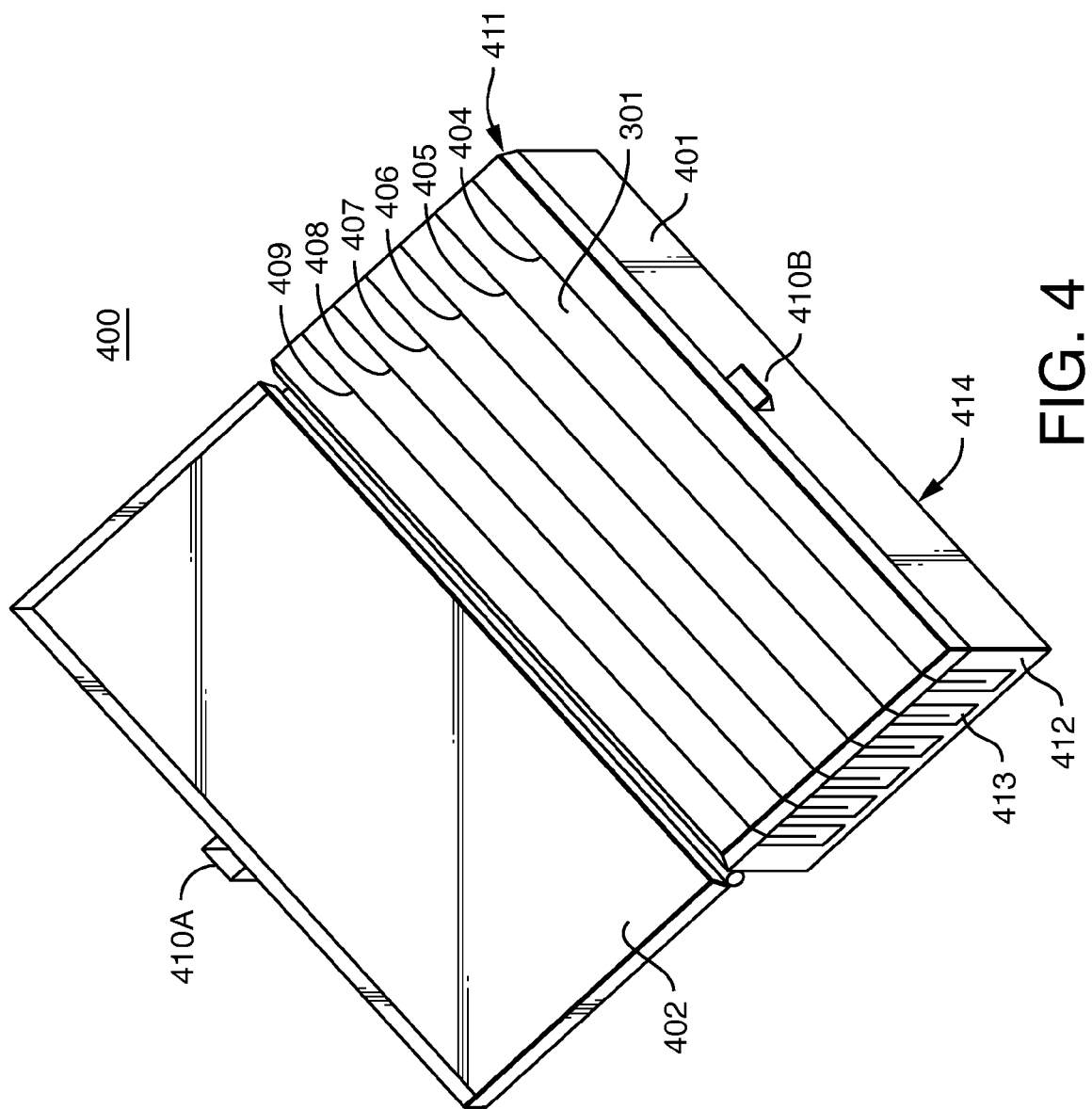
FIG. 4 is a perspective diagram of an exemplary embodiment depicting a manifold having capacity for holding a plurality of spliced optical fibers.

FIG. 4 is a perspective diagram of an exemplary embodiment depicting a manifold 400 having capacity for holding a plurality of spliced optical fibers. Manifold 400 may be comprised of a hard plastic box 414 having four sides, a bottom and a closable lid. The bottom of the box (not shown in this Fig.) is solid. The front wall 401 and its counterpart rear wall (not shown in this Fig.) also are solid. Side wall 412 and its counterpart, the opposite side wall (not shown in this Fig.) have a number of cut-outs such as cut-out 413. Each side wall has the same number of similarly-shaped and regularly-spaced cut-outs, such that each side wall is the mirror-image of the other. The cut-outs extend from the tops of these side walls down to near the bottom of the box. There is also a hinged cover 402 made from the same hard plastic as the rest of the box which is operable by a service technician who can close and lock the cover with latch 410A engaging clasp 410B.

SDM 301 is shown contained within box 414 but is shown to intentionally overflow the box which can be seen, e.g., at location 411. SDM 301 was pre-sliced before insertion into the box, and six slices 404, 405, 406, 407, 408 and 409 are shown. A design for more slices, such as twelve slices, can be readily made. The slices are approximately three-quarters of the height of the SDM, and the bottoms of the slices are preferably higher than the bottoms of the cutouts, such as the bottom of cutout 413, shown in more detail in FIG. 5. Manifold 400 is thus capable of holding up to six separate optical fibers, each being separately spliced. Each spliced fiber is inserted into a different slice, and is held by SDM at the bottom of, and/or by SDM within the walls of, the slice, to be discussed further in connection with FIG. 5.

Figure 5:
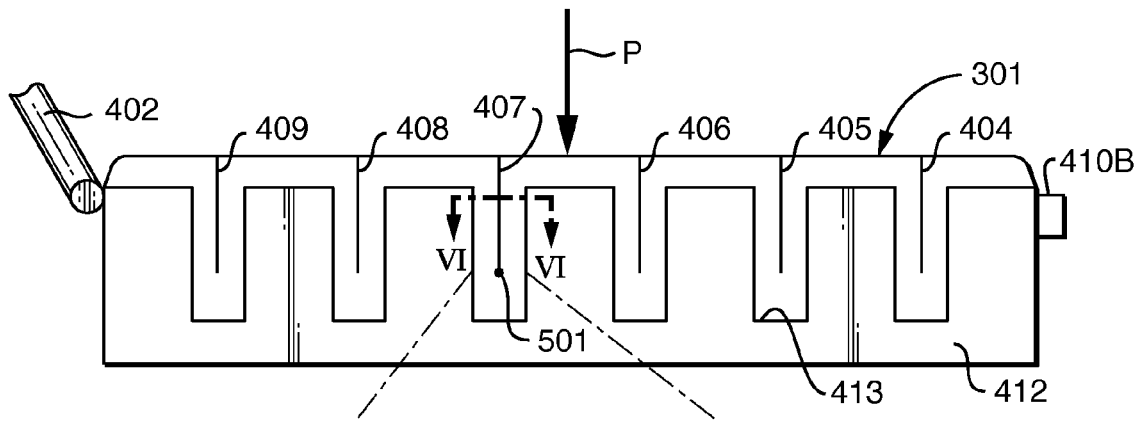
FIG. 5 is side view of an exemplary portion of FIG. 4.

FIG. 5 is a partial side view of FIG. 4 showing a side wall in detail but not showing the complete cover 402. The opposite side wall (not seen in this view) substantially matches the one that is shown. The bottom of each cut-out, such as bottom of cut-out 413, may be the same distance from the bottom of the box as the other cut-outs. SDM 301 is shown filling the box and overflowing the top of side wall 412. Six slits 404-409 are shown, with the bottom of each slit located above the bottom of its respective cut-out. In slit 407, an end view of an optical fiber 501 is shown, the fiber having previously been inserted or buried in slit 407 and held in place by SDM 301 forming the bottom and walls of slit 407. When solid cover or lid 402 is closed shut, after insertion of fiber 501, by connecting latch 410A to clasp 410B, the overflowed SDM portion is forced into the constraints of the closed box. The closed cover thus exerts a downward pressure or force in direction P on SDM 301. This causes the SDM to increase its holding and protective force upon optical fiber 501.

Figure 6:
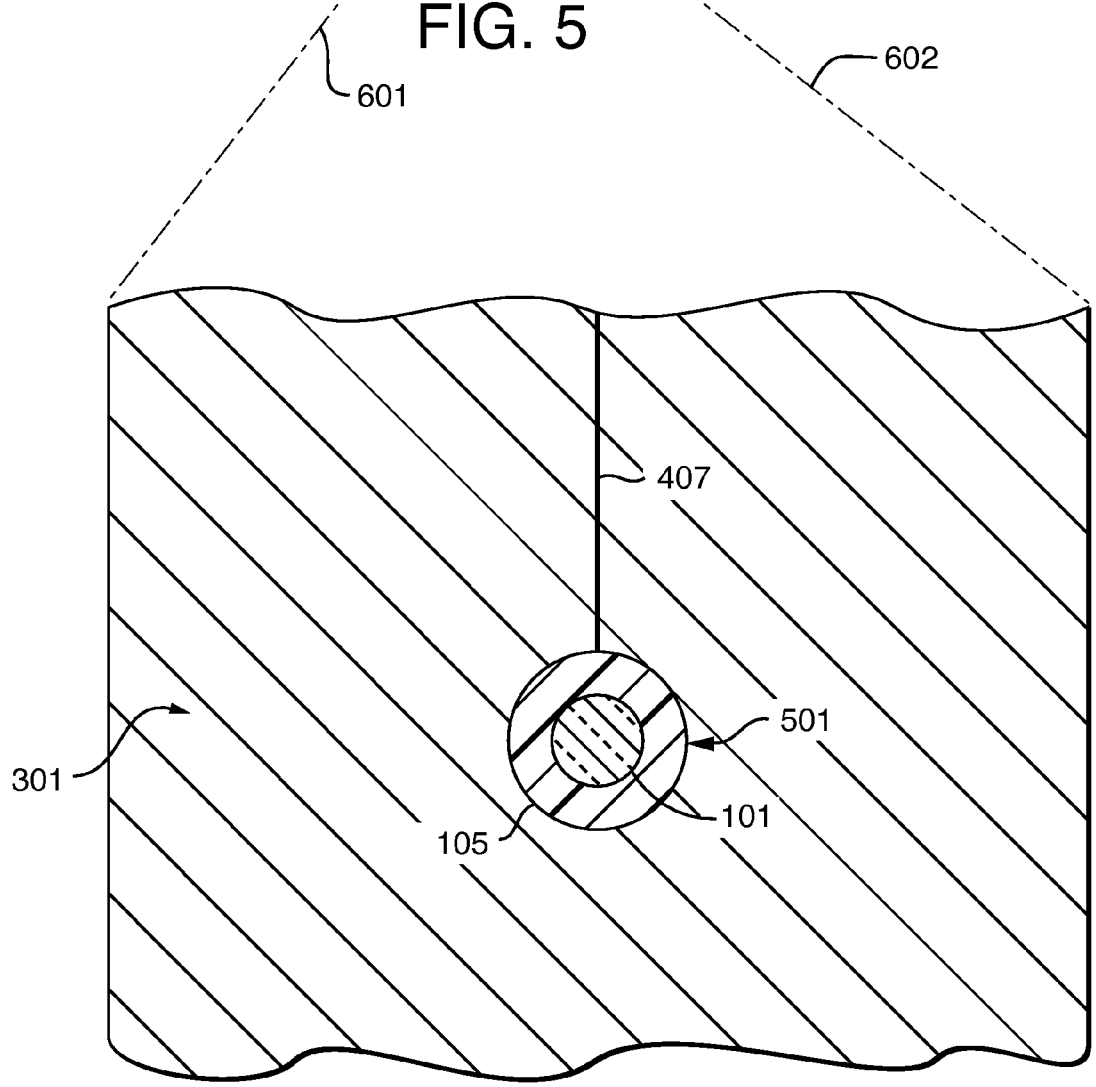
FIG. 6 is a cross-sectional view of a portion of FIG. 5 showing an end view of an exemplary embedded optical fiber which has a splice (not visible in this view) held within the SDM manifold of FIG. 4.

FIG. 6 is a cross-sectional view of a portion of FIG. 5 showing an end view of an embedded optical fiber which has a splice (not visible in this view) held within the SDM manifold of FIG. 4. Guide lines 601 and 602 show the relationship between the two Figs. In this view, optical fiber 501 is expanded to show optical glass fiber 101 surrounded by protective plastic coating 105. SDM 301 is shown holding optical fiber 501 firmly without permitting relative motion between the buried optical fiber and the SDM of the manifold in which it is held.

To remove spliced optical fiber 501 for whatever reason, a technician merely opens cover 402 to relieve the pressure on SDM 301 and then carefully spreads apart the walls of slit 407. By carefully pulling on the fiber cable located outside of the SDM-clamp, for example, using an upward motion possibly along with a simultaneous back and forth motion in the axial direction, the fiber gripped within slit 407 of the SDM-clamp is slid upward and out from slit 407. No razor knife or other special tool is needed, wherefore the time to remove the cable, and the hazard otherwise associated with removing the cable, are both substantially reduced.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. For example, other types of soft durometer materials, not necessarily limited to silicone rubber or polymer gel, but having similar characteristics thereto can be used. More or fewer than six or twelve optical fibers per manifold can be provided. Therefore, the specification and drawings are to be regarded in an illustrative rather than restrictive sense.

What is claimed is:

1. Apparatus for holding glass optical fibers comprising:
    a four-sided box formed by a solid bottom, two solid sides opposite each other and forming width and height of said box, and the other two sides forming the depth of said box while conforming to said height of said box, each of the other two sides having a plurality of similarly-shaped and regularly-spaced cut-outs formed therein opposite each other and extending from tops of said other two sides to near bottoms of said other two sides, thereby forming a like plurality of pairs of aligned cutouts on opposite sides of the width of said box;
    a cover forming the top of said box; and
    soft durometer material (SDM) filling said box to overflow capacity thereby forming an overflow-surface, said SDM having a like plurality of slits formed therein, each one of said slits being substantially parallel to at least one of said solid sides, extending from said overflow-surface to a depth above said near bottoms and spanning said width of said box in alignment with a different pair of said aligned cutouts;
    whereby said SDM forms pairs of abutting walls of each one of said slits and envelops said glass optical fibers inserted into said slits, a different one of said glass optical fibers inserted in each slit and exiting said box through its respective pair of aligned cutouts.

2. The apparatus of claim 1 wherein said cover is manually operable from an open to closed position, and vice-versa, and wherein said closed position is lockable.

3. The apparatus of claim 2 wherein said closed position causes said SDM to compress by forcing said overflow surface to conform to the inside of said cover while in said closed position, thereby exerting additional enveloping force on each of said glass optical fibers.

4. The apparatus of claim 2 wherein a particular one of said glass optical fibers comprises two separate bare-glass optical fibers that have been spliced together at a splice interface and wherein one of said pairs of said abutting walls of a respective slit envelops said splice interface.

5. The apparatus of claim 4 wherein said splice interface is held immobile within said SDM but remains readily accessible upon opening said lockable cover and removing the optical fiber associated with said splice interface.

6. The apparatus of claim 5 wherein a technician lifts said particular one optical fiber associated with said splice interface without disturbing other fibers held in said box and carrying live traffic.

7. The apparatus of claim 4 wherein optical fiber coating covers said two separate bare-glass optical fibers up to a predetermined distance from said splice interface, said distance selected to permit said pair of walls of said respective slit to envelop both said optical fiber coating and bare glass associated with said splice interface, whereby said splice interface is protected within said SDM and said optical fiber exiting said box is covered by said optical fiber coating.

8. The apparatus of claim 7 wherein diameter of a first bare glass optical fiber is approximately 125 μm and diameter of a second bare glass optical fiber with said optical fiber coating ranges from approximately 250 μm to 900 μm or more.

9. The apparatus of claim 1 wherein said SDM is selected from the group of materials consisting of: dry polymer gel and silicone rubber.

10. The apparatus of claim 9 wherein said SDM has a durometer greater than 5 and less than 20 on the Shore type A scale.

11. The apparatus of claim 1 wherein said plurality of slits falls within the range of 6 to 12 slits.

12. The apparatus of claim 1 wherein said box is configured to be stored in a splice tray.

* * * * *